US009582075B2

(12) United States Patent
Luebke (10) Patent No.: US 9,582,075 B2
(45) Date of Patent: Feb. 28, 2017

(54) GAZE-TRACKING EYE ILLUMINATION FROM DISPLAY (71) Applicant: NVIDIA Corporation, Santa Clara, CA (US)

(72) Inventor: David Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 401 days.

(21) Appl. No.: 13/946,812

(22) Filed: Jul. 19, 2013

(65) Prior Publication Data

US 2015/0022435 A1  Jan. 22, 2015

(51) Int. Cl.
*G09G 5/00* (2006.01)
*G06F 3/01* (2006.01)

(52) U.S. Cl.
CPC .................................. *G06F 3/013* (2013.01)

(58) Field of Classification Search
CPC ....................................................... G06F 3/013
USPC ......................................................... 345/156
See application file for complete search history.

(56) References Cited

U.S. PATENT DOCUMENTS

| 5,864,383 | A | * | 1/1999 | Turner | ................... | A61B 3/107 |
| | | | | | | 351/212 |
| 5,926,238 | A | * | 7/1999 | Inoue | ................... | G02B 27/108 |
| | | | | | | 250/330 |
| 5,966,242 | A | | 10/1999 | Yamanaka | | |
| 6,061,179 | A | | 5/2000 | Inoguchi et al. | | |
| 6,215,593 | B1 | | 4/2001 | Bruce | | |
| 6,381,072 | B1 | | 4/2002 | Burger | | |
| 8,523,358 | B2 | * | 9/2013 | Dejima | ................... | A61B 3/113 |
| | | | | | | 345/158 |
| 2001/0010508 | A1 | | 8/2001 | Kakeya | | |
| 2002/0089467 | A1 | | 7/2002 | Hara | | |
| 2002/0114078 | A1 | | 8/2002 | Halle et al. | | |
| 2003/0025849 | A1 | | 2/2003 | Hara | | |
| 2004/0208394 | A1 | | 10/2004 | Kurata | | |
| 2007/0002274 | A1 | | 1/2007 | Somani et al. | | |
| 2008/0049152 | A1 | | 2/2008 | Hong et al. | | |
| 2008/0239499 | A1 | | 10/2008 | Fukuda | | |
| 2009/0244682 | A1 | | 10/2009 | Saishu et al. | | |

(Continued)

FOREIGN PATENT DOCUMENTS

CN       1653374        8/2005
CN     101184166        5/2008

(Continued)

OTHER PUBLICATIONS

"Gaze-enhanced User Interface Design", Stanford HCI Group, Retrieved at: http://hci.stanford.edu/research/GUIDe/, Available as early as 2006, Accessed Aug. 14, 2013, 3 pages.

(Continued)

*Primary Examiner* — Jason Olson (57) ABSTRACT

A method to drive a pixelated display of an electronic device arranged in sight of a user of the device. The method includes receiving a signal that encodes a display image, and controlling the pixelated display based on the signal to form the display image in addition to a latent image, the latent image being configured to illuminate an eye of the user with light of such characteristics as to be unnoticed by the user, but to reveal an orientation of the eye on reflection into a machine-vision system.

20 Claims, 6 Drawing Sheets

(56) References Cited

U.S. PATENT DOCUMENTS

| | | | |
|---|---|---|---|
| 2010/0033813 A1 | 2/2010 | Rogoff | |
| 2011/0157667 A1 | 6/2011 | Lacoste et al. | |
| 2011/0164047 A1 | 7/2011 | Pance | |
| 2012/0092514 A1 | 4/2012 | Vandame | |
| 2013/0002846 A1* | 1/2013 | De Bruijn | A61B 3/113 348/78 |
| 2013/0021226 A1 | 1/2013 | Bell | |
| 2013/0106674 A1 | 5/2013 | Wheeler et al. | |
| 2013/0176386 A1 | 7/2013 | Midavaine | |
| 2013/0242402 A1 | 9/2013 | Konig | |
| 2013/0285885 A1 | 10/2013 | Nowatzyk et al. | |
| 2014/0201844 A1* | 7/2014 | Buck | G06F 21/50 726/26 |
| 2015/0042776 A1* | 2/2015 | Davis | G06K 9/036 348/78 |

FOREIGN PATENT DOCUMENTS

| | | |
|---|---|---|
| CN | 102445755 | 5/2012 |
| DE | 69216391 | 4/1997 |
| DE | 102006049404 | 4/2008 |
| DE | 102008020858 | 11/2009 |
| DE | 102008039987 | 3/2010 |
| DE | 102008042397 | 4/2010 |
| JP | 3444577 | 9/2003 |
| TW | 201219829 | 5/2012 |
| TW | 201228380 | 7/2012 |
| WO | 2011156721 | 12/2011 |
| WO | 2012034963 | 3/2012 |
| WO | 2012062681 | 5/2012 |

OTHER PUBLICATIONS

Cotting, D., et al. "Embedding Imperceptible Patterns into Projected Images for Simultaneous Acquisition and Display." Third IEEE and ACM International Symposium on Mixed and Augmented Reality (ISMAR), Nov. 2004, IEEE, 10 pages.

M. Alonso Jr. et al., "Pre-Compensation for High-Order Aberrations of the Human Eye Using On-Screen Image Deconvolution", IEEE, pp. 556-559, 2003.

Lanman, et al.; Near-Eye Light Field Displays; ACM Siggraph 2013 Emerging Technologies; Jul. 2013.

* cited by examiner

GAZE-TRACKING EYE ILLUMINATION FROM DISPLAY

BACKGROUND

An emerging area of interest in computer technology is to provide machine-vision based user input to a computer system. A suitably configured machine-vision system can acquire live video of a user, enabling the user's face to be recognized, his gestures analyzed, and so on. Output from the machine-vision system may be fed into a computer system, where it provides various control functions—launching an application, controlling the movements of a game character, etc.

Another form of user input that can be captured via machine vision is the user's ocular state, which includes gaze direction and focal plane. Such capture requires accurate imaging of the user's eyes. To this end, each eye may be illuminated in a controlled manner with light that is reflected into the machine-vision system to reveal the orientation of the eye.

BRIEF DESCRIPTION

DETAILED DESCRIPTION

This disclosure presents an approach for illuminating the eyes of an electronic-device user to enable gaze-based user input from a machine-vision system. Instead of using a separate, dedicated light source to illuminate eyes, the systems and methods disclosed herein leverage the display-system hardware of the electronic device. One embodiment provides a method to drive a pixelated display of an electronic device arranged in sight of a user of the device. The method includes receiving a signal that encodes a display image, and controlling the pixelated display based on the signal to form the display image in addition to a latent image. The latent image is configured to illuminate the eye of the user with light of such characteristics as to be unnoticed by the user, but to reveal an orientation of the eye on reflection into a machine-vision system.

Additional aspects of this disclosure will now be described by example, with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
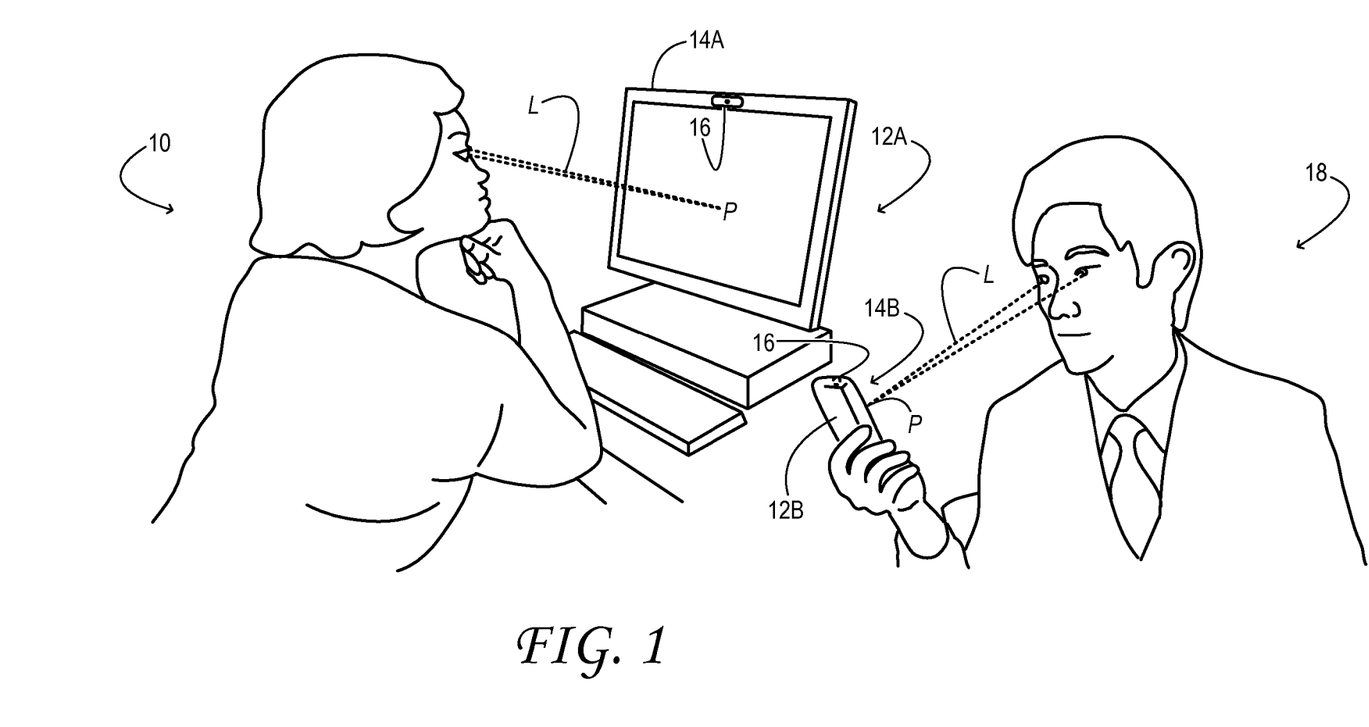
FIG. 1 illustrates example usage scenarios in which the gaze direction of a user is computed by a machine-vision system and used to control an electronic device, in accordance with an embodiment of this disclosure.

FIG. 1 illustrates example usage scenarios in which the gaze direction of a user of an electronic device is computed by a machine-vision system and used to control the device. In one scenario, user 10 is seated in front of a desktop computer 12A. The desktop computer includes a display monitor 14A for display of text, graphics, and/or video. FIG. 1 shows line segments L, which represent the direction of the user's gaze from the right and left eyes. Each line segment L begins at one eye and intersects the other segment at a focal point P, on which the user's gaze is focused.

Desktop computer 12A includes a camera 16 arranged to sight the user when the user is viewing display monitor 14A. This camera may be part of a machine-vision system that images the user's eyes, computes the coordinates of P, and provides the same as input to the desktop computer. It will be noted that the computed coordinates need not be bounded by the display area of display monitor 14A. Rather, the user may direct her gaze to any point P within her field of view, and the coordinates of that point may be computed. Such coordinates may include Cartesian coordinates (X, Y, Z), that define not only the direction of the user's gaze, but also the distance to her focal plane. Naturally, any alternative 3D-spanning coordinate system may be used instead. Moreover, numerous scenarios are possible in which the focal point does not lie within the plane of the display screen, but lies in front or behind the display screen, even while the user is actively viewing the display imagery. This may occur with 3D stereo displays, near-eye displays, or conventional displays where the user's attention is divided.

Also in FIG. 1, another user 18 is shown holding a handheld electronic device 12B. The handheld device may be a smartphone, media player, tablet computer, game system, personal digital assistant (PDA) or other handheld computer system. Handheld device 12B includes a display screen 14B for display of text, graphics, and/or video. This device, like desktop computer 12A, may include a camera 16 and associated machine-vision system to compute the coordinates of the point P on which the user's gaze is focused. A feature common to both electronic devices 12 of FIG. 1 is that the display hardware itself—e.g., display monitor 14A or display screen 14B—is used to provide the illumination of the eye that reveals the gaze direction on reflection into the machine-vision system.

No aspect of FIG. 1 should be interpreted in a limiting sense, for numerous other embodiments are contemplated as well. In lieu of desktop computer 12A, for instance, a laptop computer, video game console, internet television, or home theatre system may be coupled to display monitor 14A. Accordingly, the display monitor may be a large-format, high-definition video display, in some examples. In still other embodiments, the user may view display imagery from the electronic device on a head-mounted display system. In this embodiment, the display hardware is arranged very near to the eye, but creates a virtual image at comfortable viewing distance away from the eye. Thus, the user's eyes may be focused not on the display, but on a point behind the display. Again, the display hardware itself may be configured to provide the illumination used to reveal the direction of the user's gaze and location of the focal point.

Figure 2:
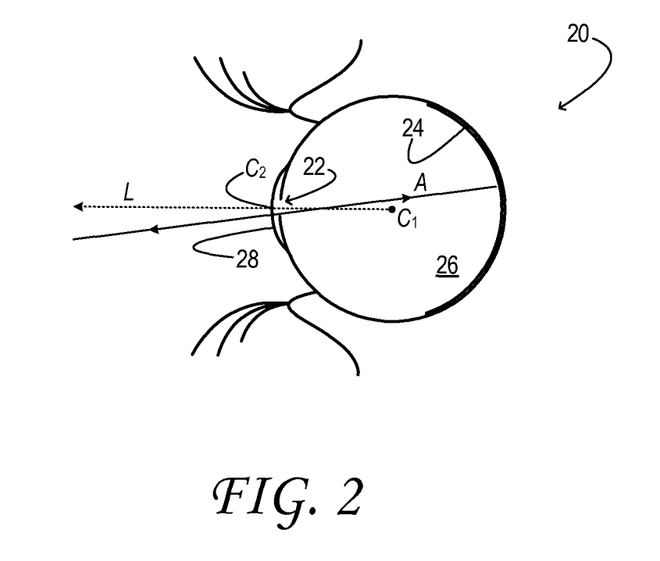
FIG. 2 is a highly simplified, cross-sectional view of a human eye in accordance with an embodiment of this disclosure.

FIG. 2 is a highly simplified, cross-sectional view of a human eye 20, which shows some features relevant to gaze tracking. In particular, the drawing shows pupil 22 and retina 24. Wetted with aqueous humor 26, the tissue of the retina is a retroreflective surface. Accordingly, light that enters through the pupil along optical path A is substantially reflected back along the same path. When this light is imaged by a camera oriented along A, it appears as a bright disk, which enables the pupil to be located. FIG. 2 also shows cornea 28. Illumination of the cornea with a point source results in a specular glint forming on the convex surface of the cornea, thereby enabling the cornea to be located. Inasmuch as the subject's gaze direction is along line segment L, which passes from the center $C_1$ of the eye through the center $C_2$ of the cornea, simultaneous location of the pupil and of the base of the cornea enables the subject's gaze direction to be computed for each eye. The focal point P (referring back to FIG. 1) is then determined as the point of intersection of the two line segments L.

Other gaze-tracking approaches are equally consistent with this disclosure. For example, the topology of the entire front surface of the user's eye—both eyes, preferably—may be mapped through state-of-the-art depth imaging. Such mapping may reveal the corneal contour of the eye, from which the orientation of the eye is determined and the user's gaze direction computed. Accordingly, camera 16 may be part of a machine-vision system configured to acquire a time-resolved sequence of depth maps of the user's eye. As used herein, the term 'depth map' refers to an array of pixels registered to corresponding regions $(X_i, Y_i)$ of an imaged subject, with a depth value $Z_i$ indicating, for each pixel, the depth of the corresponding region. 'Depth' is defined as a coordinate parallel to the optical axis of the camera, which increases with increasing distance from the camera. Operationally, a camera may be configured to acquire two-dimensional image data from which a depth map is obtained via downstream processing.

In one embodiment, brightness or color data from two, stereoscopically oriented imaging arrays in camera 16 may be co-registered and used to construct a depth map. In other embodiments, the electronic device 12 may be configured to illuminate the user's eye with a structured illumination pattern comprising numerous discrete features—e.g., lines or dots. An imaging array in the camera may be configured to image the structured illumination reflected back from the eye. Based on the spacing between adjacent features in the various regions of the image, a depth map of the eye may be constructed. In still other embodiments, the electronic device may project a pulsed illumination onto the user's eye. A pair of imaging arrays in the camera may be configured to detect the pulsed illumination reflected back from the eye. Both arrays may include an electronic shutter synchronized to the pulsed illumination, but the integration times for the arrays may differ, such that a pixel-resolved time-of-flight of the pulsed illumination, from the illumination source to the eye and then to the arrays, is discernible based on the relative amounts of light received in corresponding elements of the two arrays.

Figure 3:
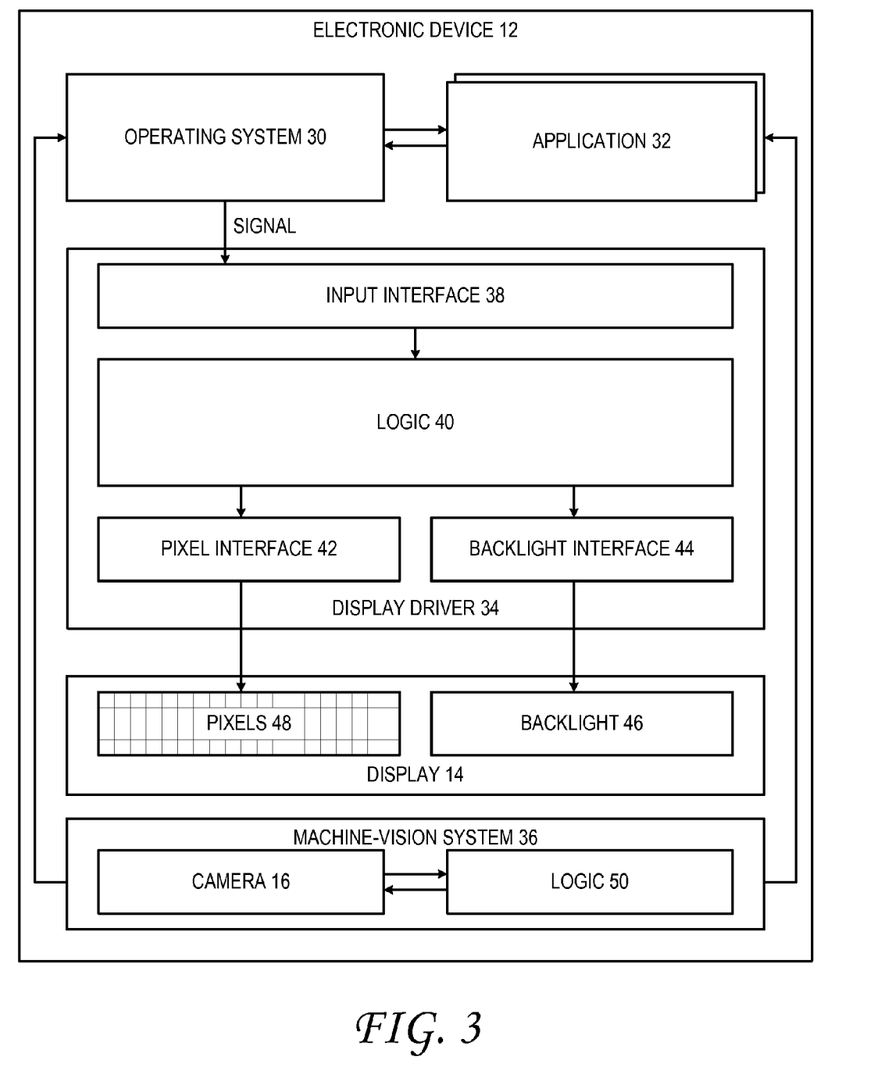
FIGS. 3 and 4 show aspects of an electronic device in accordance with embodiments of this disclosure.

FIG. 3 is a high-level, schematic diagram showing aspects of an electronic device 12 in one embodiment. Electronic device 12, as noted above, may be a desktop, laptop, or tablet computer, game console, internet television, home theatre system, handheld gaming device, smartphone, media player, PDA, etc. In the illustrated embodiment, the electronic device includes an operating system 30 and one or more applications 32. Such applications may include a video game application, a media player, or one or more productivity applications, for example. The electronic device also includes display 14, display driver 34, and machine-vision system 36. The display driver may be a graphics processing unit (GPU), in one embodiment. In typical operation, the operating system sends a signal to the display driver. The signal encodes a display image, or in other words, specifies the graphical content to be shown on the display. In the illustrated embodiment, the signal is received in input interface 38 of the display driver. Based on the content of the signal, logic 40 of the display driver controls pixel interface 42 and backlight interface 44, so that the desired display image is formed. In some scenarios, a time-resolved sequence of display images (i.e., video) may be presented on the display, with a blanking interval inserted between successive display images. It will be understood that the term 'logic', as used herein, embraces any kind of electronic componentry capable of executing an algorithm. It may include software instructions stored in electronic, optical, or magnetic memory and executed by a microprocessor, for example. In other embodiments, the logic may be instantiated at least partly in dedicated firmware or hardware—as an application-specific integrated circuit (ASIC), for example.

In the embodiment of FIG. 3, backlight interface 44 is configured to control illumination from backlight 46, which may be arranged behind display 14. Pixel interface 42 is configured to individually address and drive a plurality of pixels 48 of the display. The nature of the pixels and backlight may differ in the different embodiments of this disclosure. Accordingly, the act of driving the pixels may differ as well—it may involve control of an array of liquid-crystal display (LCD) light valves, modulation of an array of light-emitting diodes (LEDs), or deflection of an array of digital micromirror device (DMD) elements, as further described below.

In the embodiments here contemplated, electronic device 12 need not include a dedicated light source for machine vision. Instead, logic 40 may cause pixel interface 42 and backlight interface 44 to form the required display image in addition to a latent image. The latent image may be configured to illuminate the user's eyes with light of such characteristics as to be unnoticed by the user, but to reveal an orientation of the eyes on reflection into machine-vision system 36. As described in further detail below, the light of the latent image may be unnoticeable to the user due to the low amplitude, long wavelength, short duration, and/or peripheral position of the light with respect to the user's gaze. In addition, any combination of these factors may cooperate to make the light substantially unnoticeable. The machine-vision system is configured to image a reflection of the latent image from the eyes, to determine a gaze direction of the user based on the imaged reflection, and to provide user input based on the gaze direction. In general, the user input may be provided to any hardware or software component of the electronic device—to operating system 30 or any application 32, for example.

In the embodiment of FIG. 3, machine-vision system 36 includes dedicated logic 50, in addition to camera 16. To limit the responsiveness of the camera to reflected light from the latent image, an electronic shutter opening of the camera may be synchronized to the formation of the latent image. This is accomplished through logic 50 of the machine-vision system, which is operatively coupled to display-driver logic 40. In some embodiments, the aperture of the camera may be equipped with suitable filter components, including a passband filter for high sensitivity to the latent image, but reduced sensitivity to ambient light.

Figure 4:
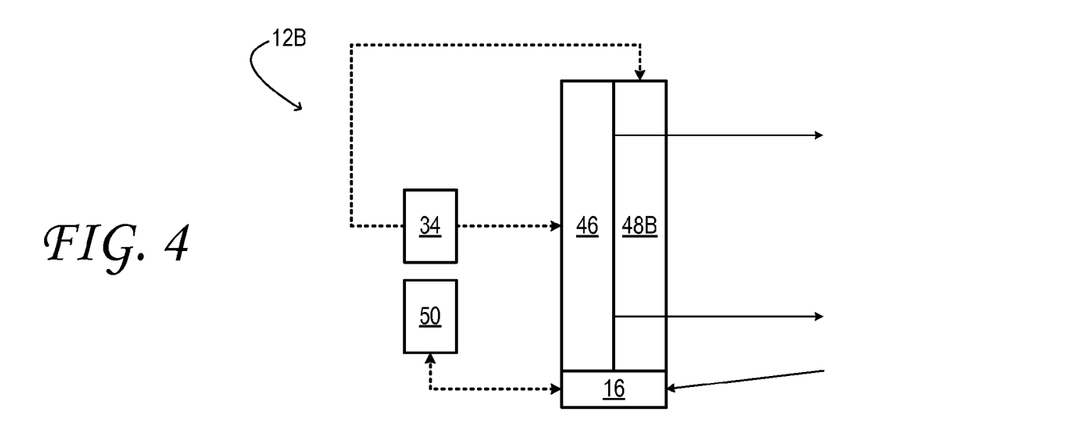

FIG. 4 shows aspects of example electronic device 12B in one embodiment. The display portion of the device includes a rectangular array of transmissive LCD pixels 48B. Each pixel is an individually addressable light valve arranged in registry with a red (R), green (G), or blue (B) color filter to form controllable R, G, and B channels. The many pixels of the array are grouped together in repeating unit cells representing all three color channels. In this embodiment, backlight 46 directs substantially white light through the LCD array. The white light is filtered through the pixels to form a color display image.

Figure 5:
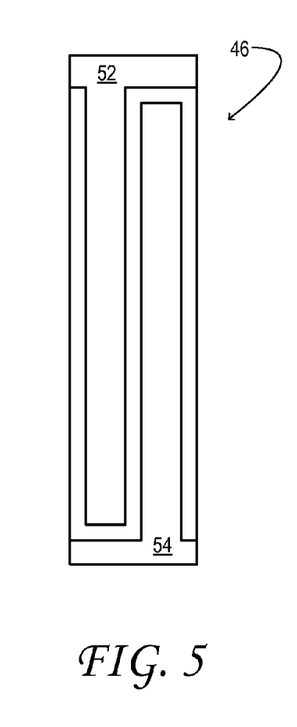
FIG. 5 shows aspects of a backlight in accordance with an embodiment of this disclosure.

FIG. 5 shows aspects of backlight 46 in one embodiment. The backlight includes visible emitter 52, which emits substantially white, visible light for forming the display image. The visible emitter may include a compact fluorescent lamp or one or more white light-emitting diodes (LEDs), for example. In the embodiment of FIG. 5, the backlight also includes an infrared (IR) emitter 54, which emits IR light. The IR light may be of a narrow wavelength band, in some embodiments. Both visible and infrared emitters may be controlled by the same backlight interface 44. The backlight may also include a collimating reflector and/or diffuser (not shown in the drawings) to direct light from the emitter along a path normal to the pixel array. Despite certain advantages of including both a visible and an infrared emitter in backlight 46, it will be understood that the infrared emitter may be omitted in some embodiments. In still other embodiments, the backlight itself may be omitted.

Figure 6:
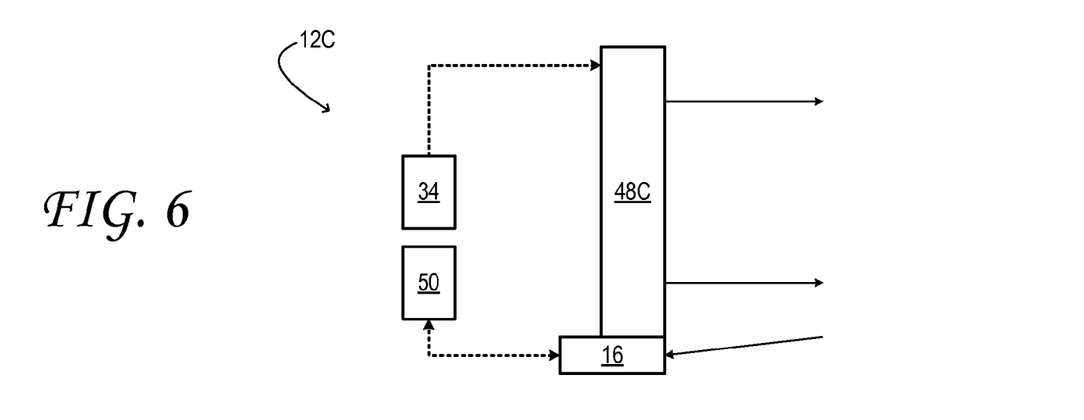
FIGS. 6 and 7 show aspects of other electronic devices in accordance with embodiments of this disclosure.

FIG. 6 shows aspects of another example electronic device 12C in one embodiment. The display portion of this device includes an array of individually addressable color LED pixels 48C. In one embodiment, the pixel array may include red, green, and blue LEDs grouped together in repeating unit cells.

Figure 7:
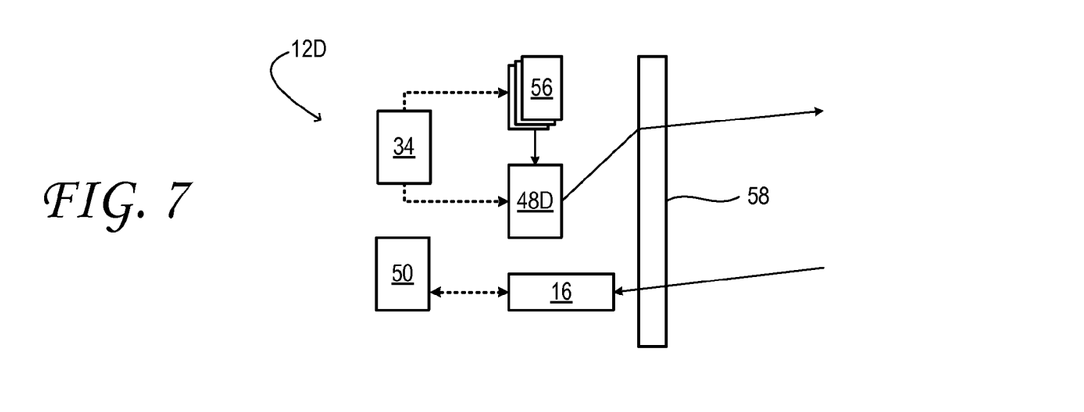

FIG. 7 shows aspects of another example electronic device 12D in one embodiment. The display portion of this device includes red, green, and blue lasers 56 and a DMD pixel array 48D. In one embodiment, the three lasers fire in succession, cycling at least once during a time constant for human visual persistence (sometimes called the 'flicker fusion interval'). Each micromirror pixel of the array is individually deflected to effect an ON or OFF state, forming, respectively, a bright or dark spot at a corresponding locus of diffuser screen 58. Pixel-wise color mixing is achieved by controlling the duty cycle over which a given pixel remains ON during the emission pulse of each laser.

The configurations described above enable various methods to drive a pixelated display of an electronic device arranged in sight of a user of the device. Accordingly, some such methods are now described, by way of example, with continued reference to the above configurations. It will be understood, however, that the methods here described, and others within the scope of this disclosure, may be enabled by different configurations as well. The methods may be entered upon any time electronic device 12 is operating, and may be executed repeatedly. Naturally, each execution of a method may change the entry conditions for a subsequent execution and thereby invoke a complex decision-making logic. Such logic is fully contemplated in this disclosure. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 8:
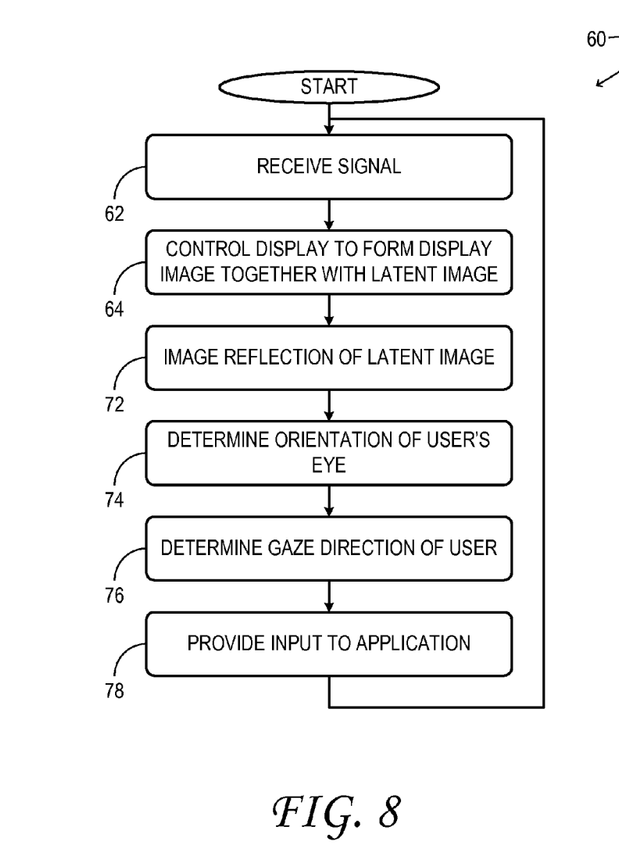
FIG. 8 illustrates a method to drive a pixelated display of an electronic device arranged in sight of a user of the device, in accordance with an embodiment of this disclosure.

FIG. 8 illustrates an example method 60 to drive a pixelated display of an electronic device arranged in sight of a user of the device. This method supports gaze tracking using illumination light from a display, in a manner that may be practically unnoticeable to the user. In addition to this advantage, the present method is generalizable to optimized patterns that enable more accurate gaze tracking with less calibration than is necessary for state-of-the-art gaze tracking. At 62 of method 60, a signal is received in display-drive circuitry of the electronic device. The signal encodes a display image. At 64 the display-drive circuitry controls the pixelated display based on the signal. More specifically, the display-drive circuitry causes the display to form the display image in addition to a latent image. The latent image is configured to illuminate the user's eye with light of such characteristics as to be unnoticed by the user, but to reveal the orientation of the eye on reflection into a machine-vision system.

Presently, several different modes of forming the display image in addition to the latent image will be described. In one embodiment, the latent image may be rendered in imperceptible IR light from backlight 46 during any suitable interval—e.g., during a period of time in which no visible light is emitted from the backlight. In scenarios in which a series of visible display images are formed in succession, the latent image may be formed during a blanking interval between consecutive display images. Thus, the display driver may turn off visible emitter 52 and turn on IR emitter 54 during the blanking interval. In this embodiment, pixel interface 42 is controlled so as to form the latent image during the blanking interval, instead of the display image. Thus, in embodiments in which the backlight includes both visible and IR emitters, it may be advantageous to adjust the duty cycles of the emitters such that only one emitter at a time is energized. This feature saves power. Nevertheless, it is also envisaged that the IR emitter need not always be powered down while the visible emitter is powered up. Likewise, suitable optical filtering on the camera may make it unnecessary to power down the visible emitter during the gaze-tracking interval.

More generally, display-driver logic 40 may exert a different mode of control over the pixel and backlight interfaces during alternating first and second intervals, which occur within a time constant for human visual persistence. During the first interval, the logic may activate the visible emitter 52 of the backlight and cause pixel interface 42 to form only the display image. During the second interval, the logic may activate IR emitter 54 and cause the pixel interface to form only the latent image. If the combined length of the first and second intervals is shorter than the time constant for human visual persistence, then the user will experience a seemingly uninterrupted display image, though at reduced brightness owing to the reduced duty cycle of the visible emitter. In this embodiment, camera 16 may have an electronic shutter opening synchronized to formation of the latent image. In this and other embodiments, the camera may have an optical filter disposed in front of its aperture. The passband of the optical filter may be chosen to match the emission band of the IR emitter.

Next is described an entirely different embodiment in which the pixels and backlight of the display are controlled differently during alternating first and second intervals. Here, display-driver logic 40 may cause pixel interface 42 to superpose a latent image on the display image during the first interval and to superpose a complement of the latent image on the display image during the second interval. In this context, to 'superpose' a second image on a first image is to increase the brightness of the pixels of the first image by the brightness of corresponding pixels of the second image. A 'complement' of the latent image will be understood to mean a brightness complement. For more information on this variant, the interested reader is referred to COMPUTER GRAPHICS Proceedings, Annual Conference Series, 1998, pages 1-10, the entirety of which is hereby incorporated by reference herein. In this embodiment, the latent image as well as the display image are rendered in visible light. Superposition may be enacted through any color channel of the display image. In one embodiment, the reflection of the latent image is obtained, in machine-vision system 36, by subtracting an image of the eye acquired during the first interval from an image of the eye acquired during the second interval. In other embodiments, XORing or other difference-emphasizing operations may be used in lieu of subtraction.

In yet another embodiment, the logic 40 of the display-drive circuitry is configured to cause the pixel interface to form the display image, while dithering a color channel of selected pixels of the display image in response to brightness of the corresponding pixels of the latent image. Such dithering of the color channel may imperceptible to the user due to the relatively small amplitude of the dithering (e.g., 1 bit), due to the rapid frequency or brief period of the dithering (>30 cycles/second), or both. One bit of dithering in an 8- or more-bit display may correspond to a difference of $\frac{1}{256}^{th}$ or less in absolute brightness, which is below the threshold sensitivity of the human visual system. In this embodiment, camera 16 may have an electronic-shutter opening synchronized to a prolonged mirror-deflection interval corresponding to the dithering of the color channel.

Figure 9:
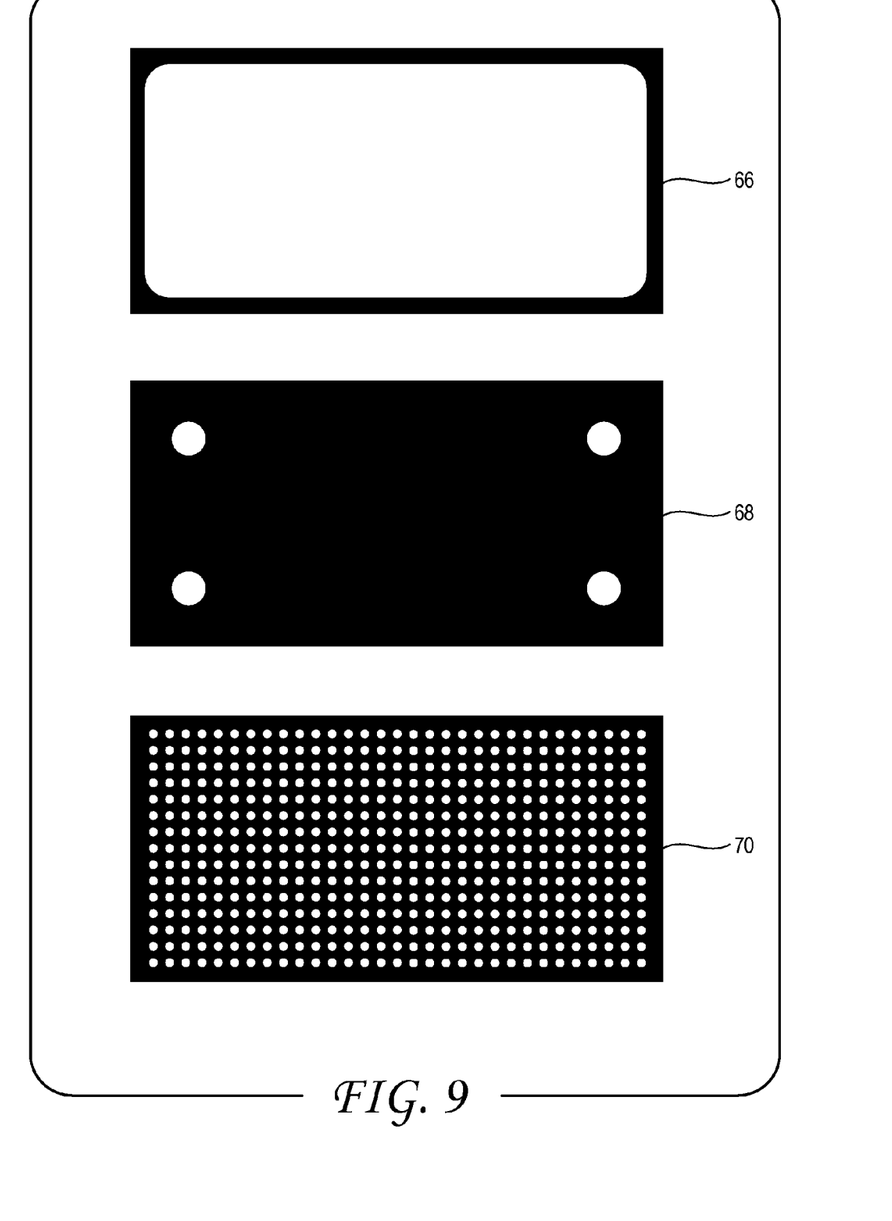
FIG. 9 shows an assortment of latent images in accordance with embodiments of this disclosure.

FIG. 9 shows an assortment of latent images that may be used in certain embodiments of this disclosure. They can be formed via any of the methods disclosed above. Latent image 66 is a broad illumination field configured to cause an imagable, disk-shaped retroreflection from a retina of the eye. As noted hereinabove, the pupil of the eye may be located based on the position of the retroreflection in an image of the user's eye. Latent image 68 includes a plurality of constant-brightness features configured to impart an imagable, specular glint or set of glints on a cornea of the eye.

In other embodiments, a plurality of features of the latent image may be reflected off the front surface of the eye, enabling a topology of the eye to be imaged. Such is the configuration of latent image 70, which presents a pattern of dots. In lieu of the dots, a pattern of lines or bands of variable thickness may be presented. In the various embodiments envisaged herein, the lines or bands may be horizontal, vertical, diagonal, or crisscrossed. In lieu of a pattern, the dots, lines, or bands of variable thickness may be presented in a pseudo-random arrangement. Latent images of this kind may be used as structured light sources to enable topological depth imaging of the user's eye. However, virtually any of the latent images disclosed herein may be presented in short pulses or in a synchronized pulse train to enable time-of-flight depth imaging of the corneal contour of the eye.

Returning now to FIG. 8, at 72 of method 60, a machine-vision system of the electronic device images—i.e., captures an image of—a reflection of the latent image from the user's eyes. At 74, the orientation of each of the user's eyes is determined, based on the imaged reflection. From the orientation of each eye, the gaze direction of each eye is determined, at 76. In some embodiments, the user's focal plane may also be determined—e.g., from the point of intersection of the gaze lines associated with each eye. At 78 input based on the user's gaze is provided to an application running on the electronic device. In other embodiments, input may be provided to an operating system of the electronic device instead of, or in addition to, the application.

No aspect of the above method should be understood in a limiting sense, for numerous variations and extensions are within the spirit and scope of this disclosure. For example, a machine-vision system optionally may be configured to image the user's face as well as his eyes. In this embodiment, user input may be provided further based on the orientation of the user's face—e.g., the constellation of muscles around the eye, which may be used to an advantage in gaze tracking. Moreover, although binocular gaze tracking has been emphasized above, this feature is by no means necessary, and indeed there are scenarios in which monocular gaze tracking may be satisfactory or preferable. Examples include when the method is used with a monocular near-eye display, or when the user exhibits strabismus.

In some embodiments, the latent image formed at 64 may be configured to provide illumination of the eye peripheral to the user's gaze. Features of the latent image, even if somewhat perceptible were the user to look directly at them, may be imperceptible if located at the periphery of the user's field of view. In order to place the features at such a location, display-driver logic 40 may require a running estimate of the user's gaze direction. In one embodiment, such an estimate is obtained from a cruder gaze-tracking approach—an approach based on the orientation of the user's face, for example. In another embodiment, the running estimate may be based on a prior iteration through method 60. This approach may enable a generally more perceptible latent image to be used for illumination of the eye—e.g., a visible-wavelength image of longer duration, larger color modulation, etc. In another, somewhat analogous embodiment, the latent image formed at 64 may be formed in front of the user's focal point (between the eye and the focal point), so that the latent image will not be focused on the user's retinas and will therefore be less perceptible to the user. This effect can be accomplished with a near-eye display configuration, where the image-forming componentry is typically quite near to the user's eye, but projects a virtual display image a comfortable distance away from the user's eye.

Further to the feature in which gaze-based user input is provided to an application or operating system running on the electronic device (78 of method 60), it will be noted that such input may achieve a variety of objectives, as outlined below.

In one example, highly accurate gaze tracking may be used to augment rendering (including 3D stereo rendering), physics, and interaction of both player and non-player characters in video-game applications. Eye contact is an important cue in social interaction, one notably missing when interacting with other user's avatars in online games and virtual worlds. A gaze system that detects what the user is looking at and directs the avatar's eyes appropriately would add to the social dimension and engagement of such games and environments. Similarly, non-player character rendering could benefit from knowledge of the user's gaze direction and eye contact. Envisaged here are non-player characters that truly 'meet' the player's eye, or refuse to look the player in the eye, glancing away quickly when their gaze is met. Envisaged also is a military game in which the player's subordinates stand a little straighter when the player looks at them.

Simulated accommodative defocus is another application area of this invention. When one looks at a nearby feature, one's eyes rotate to bring the feature onto the fovea of each eye (vergence). The muscles in each eye flex the lens to focus the feature on the fovea (accommodation). As a result of accommodation, features outside of one's depth of field (too far or too near) appear blurred. Current 3D stereo rendering provides vergence cues but not accommodative cues. For instance, a player in a first-person shooter game might have a weapon with a readout held quite close to the player's virtual face. When the player looks at the readout, the rest of world should appear as a double-image (due to vergence) and blurry (due to accommodation). Current 3D Stereo rendering provides the first cue but not the second— i.e., objects beyond the sniper-scope readout are double-imaged but sharp, a perception that never happens in the real world. In one scenario, a game application could simulate accommodation by using existing depth-of-field techniques to blur pixels of objects beyond the player's current focus.

Simulated motion-blur defocus is another application area of this invention. Motion blur in film is accepted as a cinematic device, but motion blur in interactive games is guaranteed to look wrong if the user's gaze direction is not known. For example, if an object moves rapidly across the screen it will be perceived as blurry, and might be motion-blurred to simulate this effect (unless the user's eyes are tracking the object, in which case the object will appear sharp and the background blurry). Since rapidly moving objects provide a pre-attentive cue that tends to draw the gaze, any system that attempts to perform motion blur to simulate the perception of a real, fast-moving object would have to switch between blurring the object and blurring the background, depending on what the eye was following. A high-speed low-latency gaze-tracking system would enable the renderer to estimate the velocity of each pixel across the retina and simulate the resulting shaped defocus.

Gaze-contingent level-of-detail (LOD) is another application area of this invention. Visual acuity is much lower in our peripheral vision than at the center of gaze. Perceptual psychologists have verified that contrast sensitivity falls off rapidly with eccentricity, the angular distance from the fovea, or center of gaze. This feature can be treated with texture LOD and some forms of shader LOD, with geometric LOD via on-GPU tessellation, with variable-resolution rendering, and with physics LOD (reducing the animation or simulation accuracy of peripheral objects or characters to free up cycles for those being attended to.

Saccadic cheating is another application area of this invention. The human visual system is believed to largely shut down during saccades, which are the rapid eye movements that occur as gaze flicks from one point of attention to another. Supposedly only fairly gross changes in luminance are perceptible during the frequent 10 to 100 millisecond saccade intervals. A gaze-tracking system that detects saccades could use such an interval to perform a 'cheat', such as computing collision responses and other physics calculations less accurately. The purpose of the cheat would be to free up computation for other tasks, or to arrange a plausible seeming outcome, such as causing many falling, bouncing objects to land in a predetermined pattern (by adjusting velocities and bounces during saccades).

Yet another application area of this invention is in the area of user interfaces. Standard user interfaces can be made more 'intelligent' by knowing what the user is and has been attending to. Simple examples would include not interrupting a user with a pop-up when the user is reading. Other applications include automotive driver-assist technology— to track whether a user is sleepy, or inebriated, or simply doesn't see a nearby vehicle. Still other applications include medical imaging, where a radiologist's gaze may be tracked to be sure every heuristically-determined anomalous feature in an image has been examined. If gaze tracking becomes a ubiquitous, commodity technology, many applications to user interfaces will undoubtedly follow.

Another type of gaze-responsive user interface is the so-called 'glanceable interface', in which a small display (or small section of a display) detects when the user is looking at it. Examples may include a car radio that displays a song's title, album, and artist. With current technology, this text is displayed in a scrolling-ticker style. This is annoying because the user will almost always catch it in the middle of the text. Further, it is potentially distracting because the text is moving in the user's peripheral vision. Much better would be a display that starts to scroll when the user looks at it. Full gaze tracking is not required, just the ability to detect gaze at a specific display (or section of a display or other device). For example, the display could embed a high-frequency infrared signal unique to that display, and a nearby imaging sensor could detect the retroreflected disk from the user's retina. Additional processing of the movement of the imaged disk could signal reading motions, for example.

Finally, it will be understood that the articles, systems, and methods described hereinabove are embodiments of this disclosure—non-limiting examples for which numerous variations and extensions are contemplated as well. This disclosure also includes all novel and non-obvious combinations and sub-combinations of the above articles, systems, and methods, and any and all equivalents thereof.

The invention claimed is:

1. A method of controlling a display device of an electronic device, the method comprising:
receiving a signal that represents a display image; and
controlling the display device based on the signal to render the display image and a latent image, wherein the latent image is configured to illuminate an eye of a user for determining an orientation of the eye based on light reflected into a machine-vision system, wherein the latent image is substantially transparent to the user.

2. The method of claim 1 wherein the latent image comprises a constant-brightness feature configured to impart an imagable, specular glint on a cornea of the eye.

3. The method of claim 1 wherein the latent image is configured to cause an imagable retroreflection from a retina of the eye.

4. The method of claim 1 wherein a plurality of reflections off the eye of a corresponding plurality of features of the latent image enable imaging of a topology of the eye.

5. The method of claim 1 wherein the latent image comprises a pattern of dots, lines, or bands of variable thickness.

6. The method of claim 1 the display device is controlled to render a series of display images in succession, and wherein the latent image is rendered during a blanking interval between consecutive display images.

7. The method of claim 1 further comprising:
imaging a reflection of the latent image from the eye to determine a gaze direction of the user; and
based on a subsequent signal, rendering a subsequent display image and a subsequent latent image, wherein the subsequent latent image provides illumination peripheral to the user's gaze for determining an orientation of the eye based on reflection into the machine-vision system.

8. Display-drive circuitry of an electronic device, the circuitry comprising:
an input interface configured to receive a signal representing a display image;

a pixel interface configured to address and drive a plurality of pixels of a display device of the electronic device;

a backlight interface configured to provide illumination from a backlight disposed behind the display device; and logic configured to control the pixel interface and the backlight interface in response to the signal to render the display image and a latent image, the latent image being configured to illuminate an eye off a user of the electronic device for determining an orientation of the eye based on reflection into a machine-vision system, wherein the latent image is substantially unnoticeable to the user.

9. The display-drive circuitry of claim 8 wherein the logic is configured to control the pixel interface and backlight interface during alternating first and second intervals that occur within a time constant, and wherein the pixel interface and backlight interfaces are controlled differently in the first interval relative to the second interval.

10. The circuitry of claim 9 wherein the backlight comprises a visible emitter and an infrared emitter controlled via the backlight interface, and wherein the logic is further configured:

during the first interval, to activate the visible emitter and cause the pixel interface to render only the display image as between the display image and the latent image; and during the second interval, to activate the infrared emitter and cause the pixel interface to render only the latent image as between the display image and the latent image.

11. The circuitry of claim 9 wherein the logic is configured to cause the pixel interface to:

superpose the latent image on the display image during the first interval; and superpose a complement of the latent image on the display image during the second interval.

12. The circuitry of claim 8 wherein the logic is configured to cause the pixel interface to render the display image while dithering a color channel of a pixel of the display image in response to brightness of a corresponding pixel of the latent image, and wherein such dithering of the color channel is imperceptible to the user.

13. The circuitry of claim 8 wherein the logic is configured to causes the latent image to be displayed in a short pulse for time-of-flight depth imaging of a corneal contour of the eye.

14. An electronic device comprising:
a display device;
a machine-vision system; and
display-drive circuitry comprising logic configured to control the display device to render a display image and a latent image, the latent image being configured to illuminate an eye of a user for detecting an orientation of the eye based on reflection into the machine-vision system, wherein the latent image is substantially unnoticeable to the user, wherein the machine-vision system is configured (i) to image a reflection of the latent image from the eye, (ii) to determine a gaze direction of the user based on the reflection of the latent image, and (iii) to provide input to an application program based on the gaze direction.

15. The electronic device of claim 14 wherein the display device is configured to render the latent image in front of a focal point of the eye.

16. The device of claim 14 wherein the machine-vision system comprises a camera having an electronic-shutter configured to open in synchronization to rendering the latent image.

17. The device of claim 14 wherein the logic of the display-drive circuitry is configured to superpose the latent image on the display image during a first frame and superpose a complement of the latent image on the display image during the second frame; and wherein the reflection of the latent image is obtained by subtracting an image of the eye acquired during the first interval from an image of the eye acquired during the second interval.

18. The device of claim 14 wherein the logic of the display-drive circuitry is configured to cause the pixel interface to render the display image while dithering a color channel of a pixel of the display image in response to brightness of a corresponding pixel of the latent image;

wherein the dithering of the color channel is imperceptible to the user; and wherein the machine-vision system comprises a camera having an electronic-shutter configured to open in synchronization to a prolonged mirror-deflection interval corresponding to the dithering of the color channel.

19. The device of claim 14 wherein the machine-vision system comprises a camera having an aperture and an optical filter disposed in front of the aperture, and wherein a passband of the optical filter matches an emission band of the latent image.

20. The device of claim 14 wherein the display-drive circuitry is configured to render the latent image to provide illumination of eye peripheral to the user's gaze for detecting the orientation of the eye based on reflection into the machine-vision system, and wherein the eye periphery of the user's gaze is determined from prior evaluation of the gaze direction by the machine-vision system.

* * * * *